US007485211B2

(12) United States Patent
Botte et al.

(10) Patent No.: US 7,485,211 B2
(45) Date of Patent: Feb. 3, 2009

(54) ELECTRO-CATALYSTS FOR THE OXIDATION OF AMMONIA IN ALKALINE MEDIA

(75) Inventors: Gerardine G. Botte, Athens, OH (US); Frederic Vitse, Schenectady, NY (US); Matt Cooper, Morgantown, WV (US)

(73) Assignee: Ohio University, Athens, OH (US)

( * ) Notice: Subject to any disclaimer, the term of this patent is extended or adjusted under 35 U.S.C. 154(b) by 79 days.

(21) Appl. No.: 10/962,894

(22) Filed: Oct. 12, 2004

(65) Prior Publication Data

US 2005/0211569 A1 Sep. 29, 2005

Related U.S. Application Data

(60) Provisional application No. 60/510,473, filed on Oct. 10, 2003.

(51) Int. Cl.
 C25B 11/08 (2006.01)
(52) U.S. Cl. ............. 204/293; 204/290.01; 204/290.12; 204/290.14; 204/431; 204/242; 204/266; 204/278; 204/252; 429/12; 429/40; 429/105; 205/637; 205/638; 205/639; 205/760; 205/794.5
(58) Field of Classification Search ......... 205/637–639, 205/760, 780.5; 204/293, 290.01, 290.12, 204/290.14, 252, 242, 266, 278, 431; 429/12, 429/40, 105
See application file for complete search history.

(56) References Cited

U.S. PATENT DOCUMENTS

| 3,650,838 | A | * | 3/1972 | Giner et al. ................... 429/13 |
| 3,947,333 | A | * | 3/1976 | Bianchi et al. ............. 205/639 |
| 3,956,107 | A | * | 5/1976 | Mitchell, III ................ 208/139 |
| 4,419,208 | A | * | 12/1983 | Gray ..................... 204/290.14 |
| 4,498,962 | A | * | 2/1985 | Oda et al. .................... 205/632 |
| 4,725,339 | A |  | 2/1988 | Bindra et al. |
| 6,099,704 | A | * | 8/2000 | Bacquet et al. ............. 204/291 |
| 6,531,050 | B1 | * | 3/2003 | Waite ........................ 205/742 |
| 6,533,919 | B1 | * | 3/2003 | Narayanan et al. .......... 205/637 |
| 7,098,163 | B2 |  | 8/2006 | Hampden-Smith et al. |
| 2003/0070910 | A1 |  | 4/2003 | Otsuka et al. |
| 2004/0151896 | A1 |  | 8/2004 | Houda et al. |
| 2006/0228606 | A1 |  | 10/2006 | Fiebig et al. |
| 2006/0269824 | A1 |  | 11/2006 | Hampden-Smith et al. |
| 2006/0292434 | A1 |  | 12/2006 | Hampden-Smith et al. |

FOREIGN PATENT DOCUMENTS

WO WO 02/44081 A1 6/2002

OTHER PUBLICATIONS

International Search Report from PCT/US04/33552.
Characterisation and behaviour of Ti/TiO2/noble metal anodes, Jean-Paul Gueneau de Mussy et al., Electrochimica Acta 48 (2003) 1131-1141.
Surface modification of titanium substrates for the preparation of nobel metal coated anodes, Eric Mahe et al., Electrochimica Acta 46 (2000) 629-636.
Electro-oxidation of Ammonia and its Applications, Frederic Vitse et al., Chemical Engineering Dept., Ohio University, 204th ECS Meeting, May 19, 2006.
International Preliminary Report on Patentability in Application No. PCT/US04/33552, dated Apr. 20, 2006.
International Search Report and Written Opinion in Application No. PCT/US04/33552, dated Jan. 19, 2006.
International Search Report and Written Opinion in Application No. PCT/US06/40468, dated Apr. 29, 2008.
International Search Report and Written Opinion in Application No. PCT/US06/17641, dated Jul. 16, 2008.
Adanuvor et al., "Modeling the rotating disk electrode for studying the kinetics of electrochemical reactions," J. Electrochem. Soc., (1987) vol. 134, Issue 3, pp. 625-631.
Bergamaski et al., "Effect of alcohol concentration and electrode composition on the ethanol electrochemical oxidation," Ecléctica Quimica (2003) vol. 28, Issue 2, pp. 87-92.
Cairns et al., "Ammonia-oxygen fuel cell," Nature (1968) vol. 217, pp. 780-781.
Carrett et al., "Fuel cells-fundamentals and applications," Fuel Cells (2001) vol. 1, pp. 5-39.
Choudhary et al., "CO-free fuel processing for fuel cell applications," Catalysis Today (2002) vol. 77(1-2), pp. 65-78.
Despic, et al., "Kinetics of electrochemical oxidation of ammonia in alkaline solution," Electrochim. Acta (1966) vol. 11, No. 8. pp. 997-1005.
De Souza et al., "Electro-oxidation of ethanol on Pt, Rh, and PtRh electrodes. A study using DEMS and in-situ FTIR techniques," J. Phys. Chem. (2002) vol. 106, pp. 9825-9830.
De Souza et al., "Performance of a co-electrodeposited Pt-Ru electrode for the electro-oxidation of ethanol studied by an in-situ FTIR spectroscopy," J. Electroanal. Chemistry (1997) vol. 420, pp. 17-20.
De Vooys et al., "The role of adsorbates in electrochemical oxidation of ammonia on noble and transition metal electrodes," J. Electroanal. Chemistry (2001) vol. 506, pp. 127-137.
Fujiwara et al., "Ethanol oxidation of PtRu electrodes studied by differential electrochemical mass spectrometry," J. Electroanal. Chemistry (1999) vol. 472, pp. 120-125.
Gerischer et al., "Untersuchungen zur anodischen oxidation von ammoniak an platin-elektroden," J. Electroanal. Chemistry (1970) vol. 25, pp. 421-433. (English summary at end of article.)
Gootzen, et al., "A DEMS and cyclic voltammetry study of NH3 oxidation on plantinized platinum," Electrochim. Acta (1998) vol. 43, pp. 1851-1861.

(Continued)

*Primary Examiner*—Bruce F Bell
(74) *Attorney, Agent, or Firm*—Wood Herron & Evans LLP

(57) ABSTRACT

An electro-catalyst for the oxidation of ammonia in alkaline media; the electrocatalyst being a noble metal co-deposited on a support with one or more other metals that are active to ammonia oxidation. In some embodiments, the support is platinum, gold, tantalum, or iridium. In some embodiments, the support has a layer of Raney metal deposited thereon prior to the deposition of the catalyst. Also provided are electrodes having the electro-catalyst deposited thereon, ammonia electrolytic cells, ammonia fuel cells, ammonia sensors, and a method for removing ammonia contaminants from a contaminated effluent.

26 Claims, 4 Drawing Sheets

OTHER PUBLICATIONS

Figure 1:
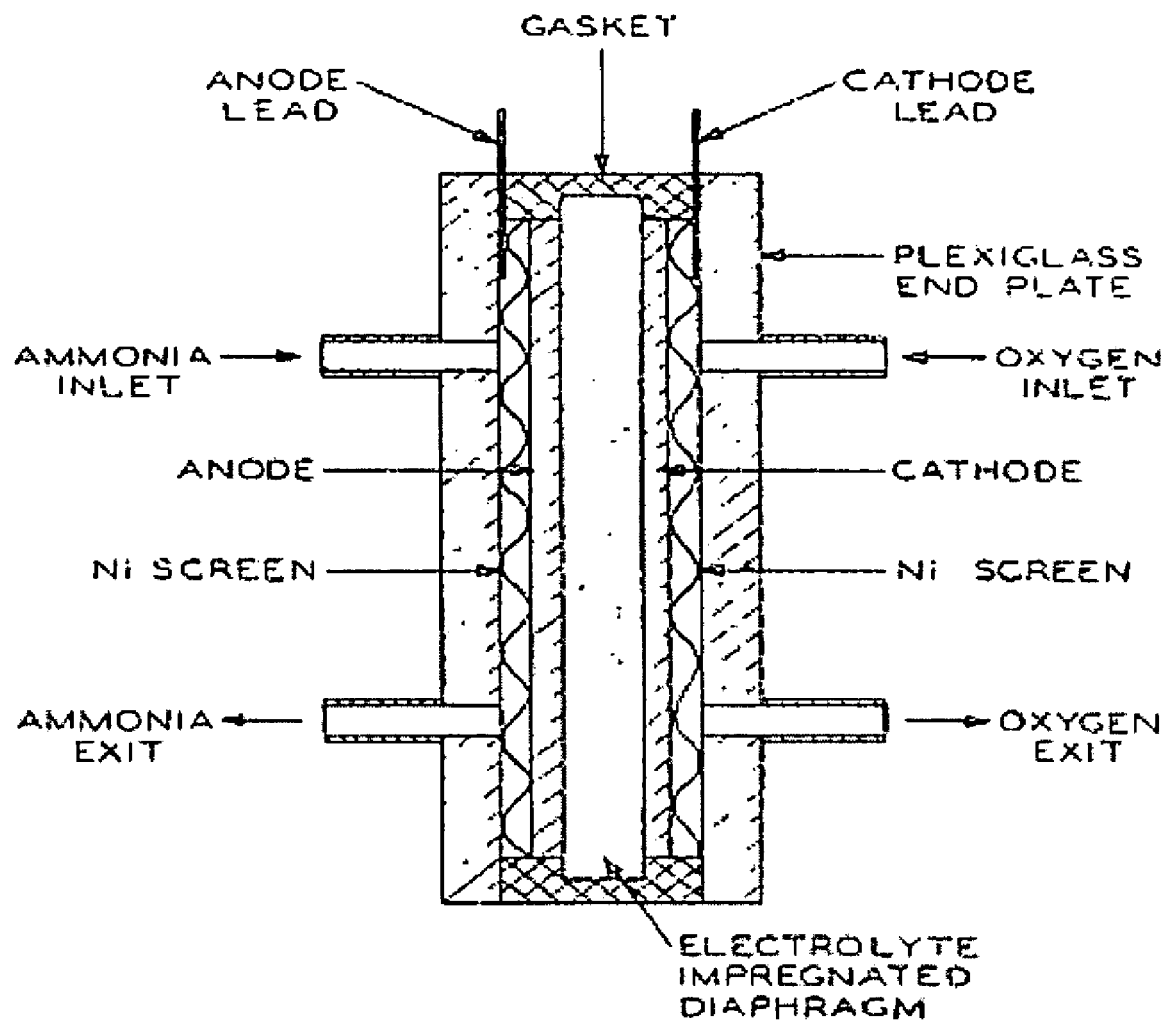

Hu et al., "Electro-oxidation of ammonia on different Ni alloy electrodes," Abs. 57, 204th Electrochemical Society Conference meeting held in Orlando, Florida, Oct. 12-16, 2003. (First publicly available on Jul. 3, 2003.).

Katan et al. "Current efficiencies for the anodic oxidation of ammonia in potassium hydroxide solution," J. Electrochem. Soc. (1963) vol. 110(9), pp. 1022-1023.

Kreuter et al., "Electrolysis: the important energy transformer in a world of sustainable energy," International Journal of Hydrogen Energy (Aug. 1998) vol. 23, No. 8, pp. 661-666.

Lopez De Mishima, et al., "Electrochemical oxidation of ammonia in alkaline solutions: its application to an amperometric sensor," Electrochimica Acta (1998) vol. 43, No. 3, pp. 395-404.

Marincic et al., "Electro-oxidation of ammonia in waste water," Journal of Applied Electrochemisty (1978) vol. 8, pp. 333-345.

Marquez et al., "Experimental and theoretical investigation of the electrolysis of ethanol for fuel cell applications," Abs. 993, 204th Electrochemical Society Conference Meeting held in Orlando, Florida, Oct. 12-16, 2003. (First publicly available on Jul. 3, 2003.).

McKee et al., "Improved electrocatalysts for ammonia fuel anodes," J. Electrochem. Soc. (1969) vol. 116, pp. 562-568.

Oswin et al., "The anodic oxidation of ammonia at platinum black electrodes in aqueous KOH electrolyte," Canadian J. Chem. (1963) vol. 41(7), pp. 1686-1694.

Sasaki et al., "Oxidation and adsorption of ammonia on a plantinized platinum electrode," J. Electrochem. Soc. (1970) vol. 117, pp. 758-762.

Schmidt et al., "Electrochemical reactivity of ethanol on porous Pt and PtRu: oxidation/reduction reactions in 1 M HClO4," J. Phys. Chem. (1996) vol. 100, pp. 17901-17908.

Simons et al., "The performance of direct ammonia fuel cells," J. Electrochem. Soc. (1969) vol. 115, pp. 556-561.

Vidal-Iglesias et al., "Selective electrocatalysis of ammonia oxidation on Pt(100) sites in alkaline medium," Electrochemistry Communications (2003) vol. 5(1), pp. 22-26.

Vitse et al., "Electro-oxidation of ammonia for fuel cell application," Abs. 1027, 204th Electrochemical Society Conference Meeting held in Orlando, Florida, Oct. 12-16, 2003. (First publicly availably on Jul. 3, 2003.).

Wasmus et al., "DEMS-cyclic voltammetry investigation of the electrochemistry of nitrogen compounds in 0.5 M potassium hydroxide," Electrochim. Acta (1994) vol. 39, pp. 23-31.

Wynveen, Chapter 12, Preliminary appraisal of the ammonia fuel cell system, Fuel Cells (1963), Young, Editor, vol. 2, pp. 153-167.

* cited by examiner

Solution: 1M $NH_3$, 5M KOH

ELECTRO-CATALYSTS FOR THE OXIDATION OF AMMONIA IN ALKALINE MEDIA

CROSS-REFERENCE TO RELATED APPLICATIONS

This application claims priority to U.S. Provisional Patent Application No. 60/510,473, entitled "Electro-catalysts for the Oxidation of Ammonia in Alkaline Media and Application to Hydrogen Production, Fuel Cells, Electrochemical Sensors, and Purification Processes," filed Oct. 10, 2003, the entirety of which is incorporated herein by reference.

BACKGROUND OF THE INVENTION

Hydrogen is the main fuel source for power generation using fuel cells, but its storage and transportation present major issues. Currently, the storage of hydrogen is not commercially feasible. Also, current hydrogen production costs make fuel cell technology for power generation economically non-competitive when compared to traditional oil generation power systems. Current technologies are able to produce hydrogen at costs of between $5 to $6 per kg of $H_2$, due to separation costs, high temperature and high pressure operating conditions, etc. Additionally, most current hydrogen production processes involve by-products such as $NO_x$ and $CO_x$, which are a hazard to the environment.

In many ways, ammonia is an ideal fuel for fuel cells and certainly shows some advantages as a precursor for hydrogen production. Ammonia represents a convenient way of securing supplies of hydrogen with one cylinder of ammonia yielding the equivalent to nine or ten cylinders of hydrogen. The fact that ammonia is easily condensed makes it a good choice for transportation and storage. Even though ammonia is flammable and toxic within defined limits, its presence can be detected by its characteristic odor. By catalytic cracking, the selectivity toward hydrogen production is very close to 100% and high purity hydrogen is obtained while nitrogen is removed by liquefaction. Ammonia is readily available and its decomposition by electro-oxidation in alkaline media is environmentally friendly with nitrogen and water as main products of reaction.

It appears that large current densities can be obtained from the oxidation of ammonia on noble metal but this electrode process is far less reversible than the oxidation of hydrogen. In the case of ammonia oxidation, anodic overpotentials can be as high as +0.5V on platinum black at ambient temperature and for current densities of 50 $mA/cm^2$. Accordingly, a need exists for new electro-catalysts that will make electrodes more reversible and improve the kinetics toward ammonia oxidation. A need also exists for new environment-friendly electrolytic cells for hydrogen production.

SUMMARY OF THE INVENTION

Provided is an electrode for the oxidation of ammonia in alkaline media; the electrode comprising a multi-metallic electro-catalyst, the multi-metallic electro-catalyst comprising a noble metal co-deposited on a support with one or more other metals that are active to ammonia oxidation. While not limited to these materials, in some embodiments, the support is platinum, gold, tantalum, or iridium. In some embodiments, the support has a layer of Raney metal deposited thereon prior to the deposition of the electro-catalyst.

Provided also is an electrolytic cell for the production of hydrogen. The electrolytic cell includes an alkaline electrolyte solution, ammonia, and one or more electrodes comprising ammonia active electro-catalysts, wherein the electro-catalysts comprise a noble metal co-deposited on the support with one or more other metals that are active to ammonia oxidation. The electrolytic cell is also useful for the production of nitrogen gas.

Provided also is an ammonia fuel cell comprising an anode, a cathode, an alkaline electrolyte, and ammonia; wherein the anode comprises an electro-catalyst, wherein the electro-catalysts comprise a noble metal co-deposited on the support with one or more other metals that are active to ammonia oxidation. Provided also is an ammonia sensor which utilizes the electro-catalysts developed for the oxidation of ammonia. Provided also is a method of treating effluents having ammonia contaminants using an ammonia electrolytic cell.

BRIEF DESCRIPTION OF THE INVENTION

Figure 2:
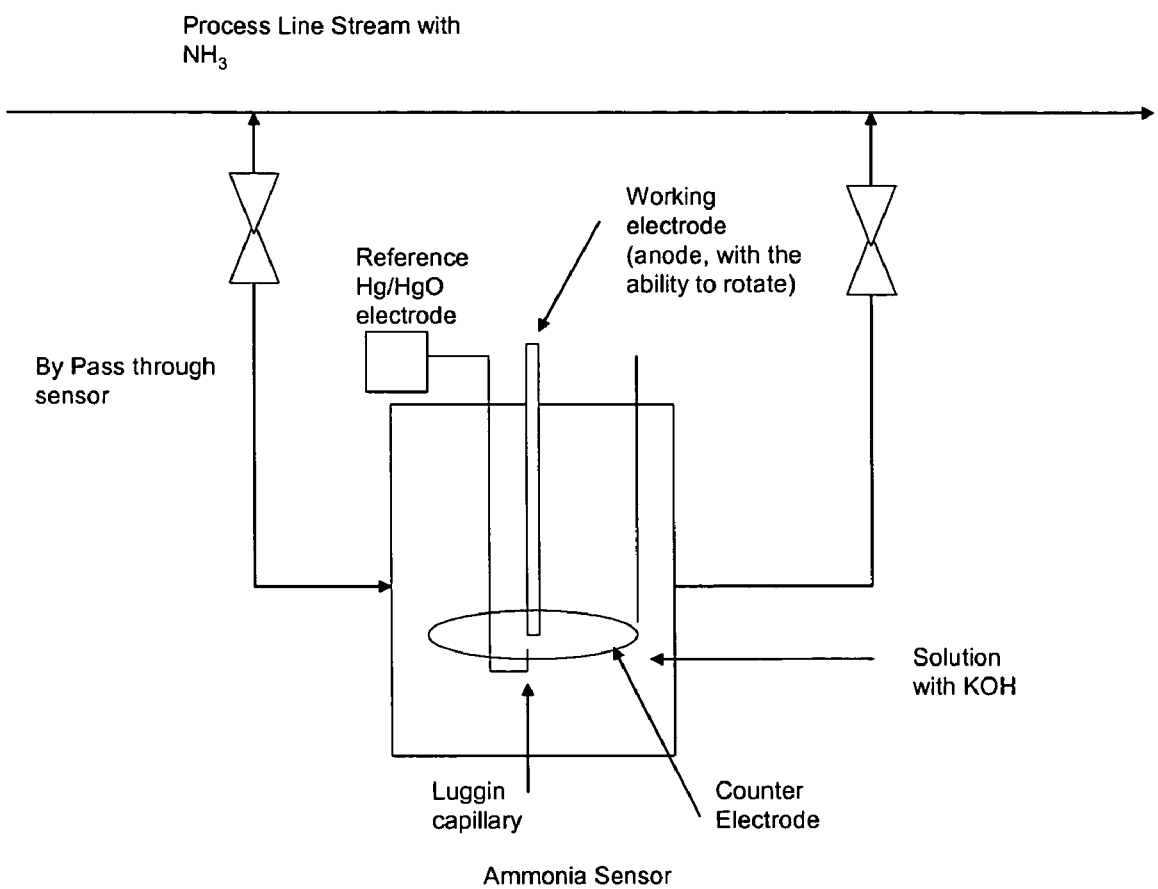
Figure 3:
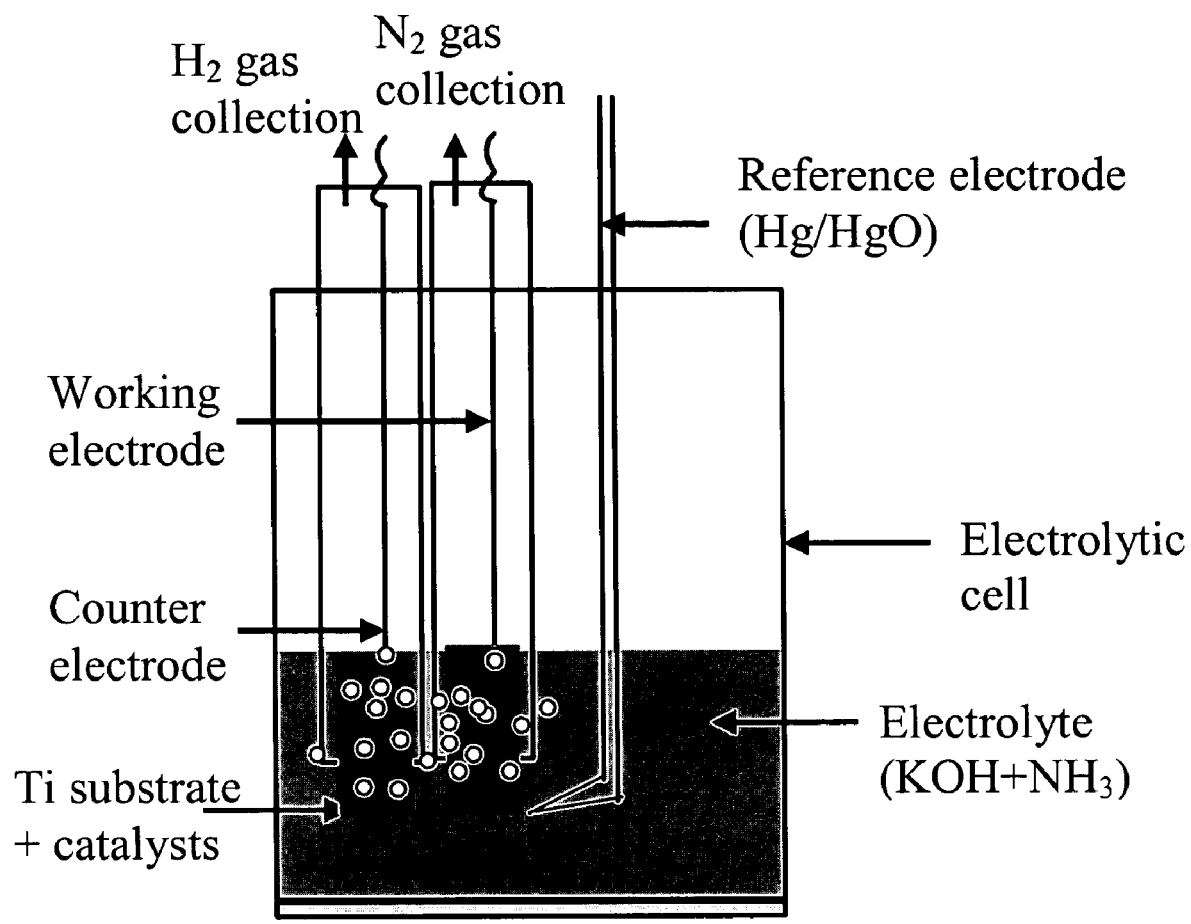
Figure 4:
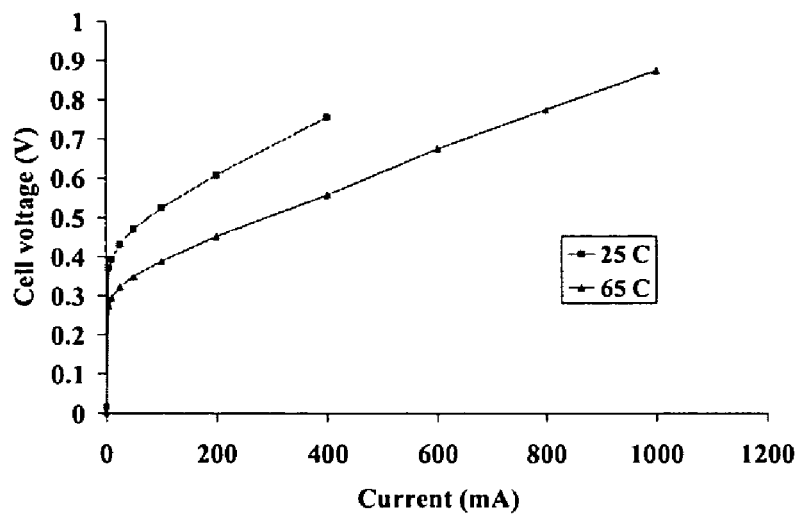
Figure 5:
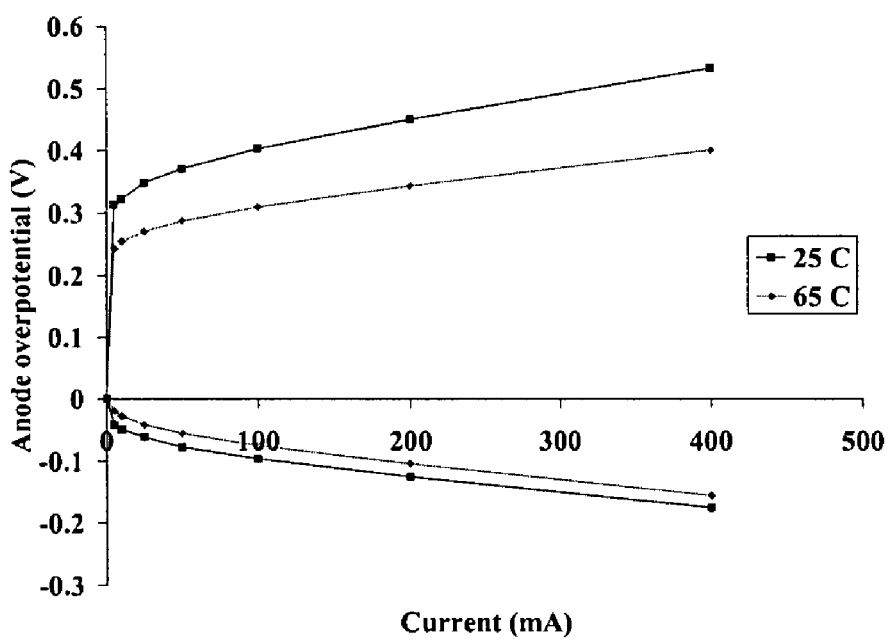

FIG. 1 depicts one embodiment of an ammonia fuel cell.
FIG. 2 depicts one embodiment of an ammonia sensor.
FIG. 3 shows a schematic of a one-compartment alkaline electrolytic cell.
FIG. 4 shows the cell voltage for a Pt—Ir, Pt—Ru electrolytic cell.
FIG. 5 shows the overpotential at the anode Pt—Ir and cathode Pt—Ru of an electrolytic cell.

DETAILED DESCRIPTION OF THE INVENTION

The electro-catalysts for the oxidation of ammonia in alkaline media described herein have applications for hydrogen production, ammonia fuel cells, ammonia electrochemical sensors, and purification processes for ammonia-contaminated effluents.

Provided are electrodes comprising multi-metallic electro-catalysts which comprise a noble metal-containing catalyst on a substrate or support. The support may be chosen from many known supports, including, but not limited to noble metal meshes and foils, such as platinum mesh, platinum foil, gold mesh, gold foil, tantalum mesh, tantalum foil, as well as platinum or iridium sponges. In one embodiment, the electrodes include a bi- or tri-metallic electro-catalyst electroplated directly on a support. In this embodiment, the electrode comprises a noble metal co-electroplated with one or two other metals suitable for ammonia oxidation. In some embodiments, the noble metal is platinum. Suitable metals for the multi-metallic electro-catalysts include any metals that are active with respect to ammonia oxidation. In some embodiments, the metals for bi- and tri-metallic electro-catalysts are selected from platinum, iridium, ruthenium, rhenium, palladium, gold, silver, nickel, and iron. While most embodiments of the multi-metallic electro-catalysts described herein refer to bimetallic and tri-metallic catalysts, also embodied are multi-metallic catalysts comprising more than three metals co-deposited on a support.

In another embodiment, the electrode comprises one or more noble metals or a noble metal and one or more other metals active to ammonia oxidation, electroplated on a support that has been treated first with a Raney metal. The support may be selected from the same supports as above, namely, noble metal meshes and foils, such as platinum mesh, platinum foil, gold mesh, gold foil, tantalum mesh, tantalum foil, as well as platinum or iridium sponges. In this embodiment, a layer of Raney metal, such as Raney Nickel, Raney Cobalt, Raney Titanium, is deposited on the substrate. After deposition of the Raney metal, the support is treated to remove at least some of the aluminum, and then an electro-catalyst is electroplated on the Raney metal treated support.

In some embodiments, the Raney metal used is Raney Nickel. In some embodiments, the catalyst is a noble metal, such as, but not limited to platinum. In other embodiments, the catalyst is a bi- or tri-metallic catalyst which includes at least one noble metal. In these embodiments, the bi- or tri-metallic catalyst includes a noble metal co-electroplated with one or two other metals that are active with respect to ammonia oxidation. Suitable metals for the bi- or tri-metallic catalysts include any metals that are active with respect to ammonia oxidation. In some embodiments, the metals for bi- and tri-metallic catalysts are selected from the group consisting of platinum, iridium, ruthenium, rhenium, palladium, gold, silver, nickel, and iron.

In the embodiments wherein the electro-catalysts comprise electrodeposited noble metals on a Raney metal-treated support, the high surface area of the Raney metal allows for a small amount of noble metals to be deposited in a thin layer, while the active surface of these noble metals remains high. While previous tests done using Raney Nickel as a catalyst for $NH_3$ oxidation for production of hydrogen showed little, if any, catalytic properties, surprisingly, the electro-deposition of platinum onto a Raney metal layer shows much greater catalytic activity than with platinum alone. In preparing the catalysts described herein, it appears that an unanticipated synergistic effect occurs when using platinum and Raney alloy together as an electro-catalyst.

The electrodes comprising the electro-catalysts described herein are especially useful for ammonia oxidation, particularly in alkaline media. These catalysts are particularly useful in following applications: electrolytic cells for the production of hydrogen from ammonia solution in alkaline media using the catalyst as an anode or as a cathode; ammonia fuel cells using the catalyst as an anode; sensors for ammonia concentration/activity measurements using the catalyst as part of the sensing element; electrochemical treatment processes where ammonia-contaminated effluents are purified by oxidation of ammonia using the catalyst.

The electrodes comprising electro-catalysts described herein are useful in electrolytic cells for the production of hydrogen. The electrolytic cells comprise a) one or more electro-catalysts; and b) an alkaline, i.e., a basic electrolyte, solution; and c) ammonia. The basic electrolyte can be any alkaline electrolyte that is compatible with the electro-catalyst, does not react with ammonia, and has a high conductivity. In most embodiments, the basic electrolyte is added in excess of the stoichiometric proportions needed. In some embodiments, the basic electrolyte is added at a level of about three times greater than the amount of ammonia added, stoichiometrically. In some embodiments, the electrolyte is potassium hydroxide, which may be used at a concentration of about 3M to about 7M. In some embodiments, the potassium hydroxide is added at a level of about 5M. Another example of a suitable basic electrolyte is sodium hydroxide at similar concentration levels. While potassium hydroxide and sodium hydroxide are illustrative of alkaline electrolytes that may be used, many other alkaline electrolytes known to those skilled in the art may also be used.

The ammonia for the electrolytic cells described herein is an ammonia solution, wherein the source of the ammonia is not particularly limited. The ammonia for the electrolytic cells may be dissolved in water, i.e., ammonium hydroxide, which may be stored until ready for use, and then fed directly to the cell. The ammonia may be stored as a liquefied gas, at higher pressure, and then combined with water and the electrolyte when ready to use. The ammonia may also be obtained from suitable ammonium salts, such as but not limited to ammonium sulfate, dissolved in the electrolyte solution. The ammonia may be present at a concentration from about 0.01M to about 5M. In some embodiments, the ammonia concentration in the electrolytic cell will be from about 1M to about 2M at ambient temperature. At higher temperatures, higher concentrations of ammonia may be desired.

The electrodes comprising the electro-catalysts described herein may be used as the anode of the electrolytic cell, or as both the anode and the cathode. In one embodiment, the electrolytic cell has a) at least one electrode comprising a bi- or trimetallic electro-catalyst as described herein; b) potassium hydroxide at a concentration from about 3 M to about 7 M; and c) ammonia at a concentration from about 0.5 M to 2 M. In another embodiment, the electrolytic has a) two electrodes comprising electro-catalysts described herein; 2) about 5 M potassium hydroxide; and 3) about 1 M ammonia. In another embodiment, the anode and the cathode of the electrolytic cells are electrodes comprising Pt—Ru catalysts. The Pt—Ru catalysts are selected from Pt:Ru ratios of 1:25 to 1:5. In one embodiment, the Pt:Ru ratio is 1:25, in another embodiment, the Pt:Ru ratio 1:5, and in yet another embodiment, the Pt:Ru ratio is 1:10. Other intermediate ratios may also be used. In other embodiments, electrodes comprising other bi- or trimetallic catalysts described herein are used. In other embodiments of the electrolytic cell, an electrode comprising the electro-catalyst described herein is used as only the anode or the cathode, the other may then be selected from any electrode having an activity toward hydrogen evolution in alkaline media. Some examples of such electrodes include, but are not limited to noble metals, such as platinum, rhenium, palladium, as well as Raney Nickel. Still other suitable electrodes can readily be determined by those skilled in the art.

The electrolytic cell can operate over a wide range of temperatures. Generally the electrolytic cell described herein may be operated from about 20° C. to about 70° C. In one embodiment, the electrolytic cell is operated at ambient temperature. In another embodiment, the electrolytic cell is operated in the temperature range from about 60° C. to about 70° C. In another embodiment, the electrolytic cell is operated in the temperature range from about 20° C. to about 60° C. In another embodiment, the electrolytic cell is operated in the temperature range from about 30° C. to about 70° C. In another embodiment, the electrolytic cell is operated in the temperature range from about 30° C. to about 60° C. In another embodiment, the electrolytic cell is operated in the temperature range from about 40° C. to about 50° C. In yet another embodiment, pressures higher than atmospheric pressure would be used, allowing temperatures higher than 70° C. to be used.

The current densities applied to the electrolytic cell to produce hydrogen may be in the range from about 25 $mA/cm^2$ to about 500 $mA/cm^2$. In some embodiments, the current densities are in the range from about 50 $mA/cm^2$ to about 100 $mA/cm^2$. In some embodiments, the current densities are in the range from about 25 $mA/cm^2$ to about 50 $mA/cm^2$. In some embodiments, the current densities are in the range from about 50 $mA/cm^2$ to about 500 $mA/cm^2$. In some embodiments, the current densities are in the range from about 100 $mA/cm^2$ to about 400 $mA/cm^2$. In some embodiments, the current densities are in the range from about 200 $mA/cm^2$ to about 300 $mA/cm^2$.

Also provided are methods of preparing hydrogen gas, wherein the method involves oxidizing ammonia in the above-described electrolytic cell. When preparing hydrogen gas using the electrolytic cell, a stoichiometric excess of basic electrolyte is used. In some embodiments, the basic electrolyte is present at a level of at least three times greater than the amount of ammonia. In some embodiments, the electrolyte for the electrolytic cell is KOH. In some embodiments, the concentrations for the alkaline electrolyte and ammonia in the electrolytic cell are 5M and 1M, respectively. In an electrolytic cell, the temperature of the electrolytic cell and the current densities affect the amount of hydrogen produced. Suitable temperatures and current densities are as described above.

The electrolytic cell described herein produces both hydrogen and nitrogen gas. Accordingly, the same method for the production of hydrogen gas may be applied for the production of nitrogen gas by recovering the nitrogen gas produced by the oxidation of ammonia.

The electro-catalysts described herein also have application in ammonia fuel cells. An ammonium fuel cell has an anode, wherein the anode is an electrode comprising the catalyst described herein; a cathode, ammonia, and a basic (i.e., an alkaline) electrolyte. Nickel and platinum black are two non-limiting examples of suitable cathodes, though other cathodes known to those skilled in the art may be used. The fuel cell may be operated at any temperature from about ambient temperature, e.g., about 20° C. to 25° C. up to about 70° C. In some embodiments, the fuel cells are operated at ambient temperature. In some embodiments, the basic electrolyte used in the fuel cell may be any suitable basic electrolyte, for example, an inorganic hydroxide, such an alkali metal hydroxide or alkali earth metal hydroxide. Suitable basic electrolytes include alkaline media that do not adversely affect the catalysts described herein, do not react with ammonia, and have good conductivity. In some embodiments, the alkaline electrolytes are potassium hydroxide or sodium hydroxide. In one embodiment, the electrolyte is potassium hydroxide. The amount of the basic electrolyte used in the fuel cell is in stoichiometric excess of the amount of ammonia. In some embodiments, the concentration of the alkaline electrolyte is at least about three times greater than the concentration of the ammonia. In one embodiment, the concentrations of basic electrolyte and ammonia are about 5M and about 1M, respectively. The ammonia for the fuel cell can be from liquid or gaseous ammonia dissolved in water or in the basic medium, or it can be from a suitable ammonium salt dissolved in the basic medium.

The electro-catalysts of the present invention are also useful for in sensors for the detection of ammonia. The substantial current response collected at the anode during oxidation of ammonia (even at small concentrations) in the presence of the developed catalyst makes these catalyst ideal for use in ammonia electrochemical sensor. These electrochemical sensors may be used to determine even trace amounts of ammonia contamination in a sample.

The strong activity of ammonia on the present electrocatalysts, even with low ammonia concentrations are useful in processes for removing ammonia from contaminated effluents. Accordingly, also provided are methods for removing ammonia contaminants from contaminated effluents; the method comprising using the electro-catalysts described herein to oxidize the ammonia contamination in the contaminated effluent. In this method, an electrolytic cell may be prepared which uses at least one electrode comprising the electro-catalysts described herein to oxidize ammonia contaminants in effluents. The effluent may be fed as a continuous stream, wherein the ammonia is electrochemically removed from the effluent, and the purified effluent is released or stored for other uses.

As used herein, the terms "support" and "substrate" are interchangeable and used to refer to the base material upon which the electro-catalyst is deposited; the terms catalyst and electro-catalyst are also used interchangeably to refer to the ammonia-active electro-catalysts described herein. The electrodes described herein comprise a noble metal-containing electro-catalyst electroplated, i.e. deposited, on the substrate or support. The electro-catalysts may be bi- or trimetallic, and comprise at least one noble metal and one or more other metals that are active to ammonia oxidation. The other metals may be, but are not necessarily noble metals. In some embodiments, the electrocatalyst comprises a single noble metal on a Raney metal treated support. The support may be chosen from many known supports. Some suitable supports include noble metal meshes and foils, such as platinum mesh, platinum foil, gold mesh, gold foil, tantalum mesh, tantalum foil, as well as platinum or iridium sponges. When mesh is used as the substrate, the mesh size will be chosen such that it can be properly electroplated with the electro-catalyst, whether it is a bi- or trimetallic catalyst electroplated on the substrate, or a bi- or trimetallic/Raney metal catalyst electro-deposited on the substrate. Aside from the specific substrates listed, other suitable supports will be recognized by those of ordinary skill in the art. In some embodiments, the electrode is a bi- or tri-metallic electro-catalyst electroplated directly on a support.

The electrodes described herein comprise a noble metal-containing electro-catalyst on a substrate or support. The support may be chosen from many known supports, including those described above, as well as other supports known to those skilled in the art. In some embodiments, the catalyst is a bi- or tri-metallic catalyst electroplated directly on a support. The bi- and trimetallic catalysts include a noble metal, platinum in some embodiments, co-electroplated with one or two other metals that are active with respect to ammonia oxidation. Suitable metals for bi- and trimetallic catalysts are selected from platinum, iridium, ruthenium, rhenium, palladium, gold, silver, nickel, and iron. By way of example, in one embodiment, the electrode is a platinum-iridium electro-catalyst electrodeposited on platinum mesh.

In another embodiment, the electrode comprises a noble metal and optionally, one or more other metals active to ammonia oxidation electroplated on a support that has been treated first with a Raney metal. For these electrodes, the support may be selected from the same supports as above, namely, noble metal meshes and foils, such as platinum mesh, platinum foil, gold mesh, gold foil, tantalum mesh, tantalum foil, as well as platinum or iridium sponges, and other supports known to those of ordinary skill in the art. In this embodiment, a layer of Raney metal, such as Raney Nickel, Raney Cobalt, Raney Titanium, is deposited on the substrate. After deposition, the support is treated to remove at least some of the aluminum, and the electro-catalyst is electroplated on the support. In one embodiment, the Raney metal used is Raney Nickel. In some embodiments, the electro-catalyst is a single noble metal. In one embodiment, the catalyst is platinum deposited on the Raney metal. In another embodiment, the catalyst is a bi- or tri-metallic electro-catalyst, wherein at least one of the metals is a noble metal. In this embodiment, the bi- and tri-metallic electro-catalysts have a noble metal co-electroplated with one or two other metals that are active with respect to ammonia oxidation. Suitable metals for the bi- or tri-metallic catalysts include any metals that are active with respect to ammonia oxidation. In some embodiments, suitable metals for bi- and trimetallic catalysts are selected from platinum, iridium, ruthenium, rhenium, palladium, gold, silver, nickel, and iron.

For bimetallic electro-catalysts, in many embodiments, the electro-catalyst comprises the noble metal platinum another metal selected from iridium, ruthenium, rhenium, palladium, gold, silver, nickel, and iron. In some embodiments, the platinum makes up 50%, 55%, 60%, 65%, 70%, 75%, 80%, 85%, 90% or more of the electro-catalyst. In other embodiments, the electro-catalysts may contain less than 50% platinum, i.e., 45%, 40%, 35%, 30%, 25%, 20%, 15%, or 10% platinum. In some embodiments, the electro-catalyst is co-deposited platinum and ruthenium. In one embodiment, the electro-catalyst contains from 1% to 85% ruthenium and from 99% to 15% platinum, i.e., the catalyst may contain 99%, 95% 90%, 85%, 80%, 75%, 70%, 65%, 60%, 55%, 50%, 45%, 40%, 35%, 30%, 25%, 20%, or 15% platinum and 1%, 5%, 10%, 15%, 20%, 25%, 30%, 35%, 40%, 45%, 50%, 55%, 60%, 65%, 70%, 75%, 80%, or 85% ruthenium. In another embodiment, the ruthenium and the ranges from 0% to 50% ruthenium and from 100% to 50% platinum. In this embodiment, the electro-catalyst may contain 100% 99%, 95% 90%, 85%, 80%, 75%, 70%, 65%, 60%, 55%, 50% platinum and trace amounts, 0%, 1%, 5%, 10%, 15%, 20%, 25%, 30%, 35%, 40%, 45%, or 50% ruthenium. In another embodiment, the platinum-ruthenium electro-catalyst comprises from about 5% to about 20% ruthenium and from about 95% to about 80% platinum, including 5%, 6%, 7%, 8%, 9%, 10%, 11%, 12%, 13%, 14%, 15%, 16%, 17%, 18%, 19%, and 20% ruthenium and 95%, 94%, 93%, 92%, 91%, 90%, 89%, 88%, 87%, 86%, 85%, 84%, 83%, 82%, 81%, and 80% platinum. In yet another embodiment, platinum-ruthenium catalyst comprises about 15% ruthenium and about 85% platinum. In another embodiment, electro-catalyst comprises iridium and platinum. In one embodiment, the electro-catalyst comprises about 10% iridium to about 50% iridium and from about 90% platinum to about 50% platinum. In this embodiment, the electro-catalyst may contain 100% 99%, 95% 90%, 85%, 80%, 75%, 70%, 65%, 60%, 55%, or 50% platinum and 0%, 1%, 5%, 10%, 15%, 20%, 25%, 30%, 35%, 40%, 45%, or 50% iridium. In another embodiment the platinum-iridium catalyst electro-comprises more than 50% iridium, i.e., 50%, 55%, 60%, 65%, 70%, 75%, 80%, 85%, 90% iridium with the balance platinum. All of these electro-catalysts are deposited on a support to form the electrode. In some embodiments, the support is first treated with Raney Nickel, and the electro-catalyst is deposited on the Raney-metal treated support. In one embodiment, the electro-catalyst comprises platinum and iridium which is co-deposited on a Raney Nickel support. In one such embodiment, the electro-catalyst comprises from 50% to 90% platinum and from 10% to 50% iridium on a Raney Nickel support, i.e., 100% 99%, 95% 90%, 85%, 80%, 75%, 70%, 65%, 60%, 55%, or 50% platinum and 0%, 1%, 5%, 10%,15%, 20%, 25%, 30%, 35%, 40%, 45%, or 50% iridium. In another embodiment, the electrode comprises an electro-catalyst comprising platinum and ruthenium co-deposited on a Raney Nickel support. In another embodiment, the electrode comprises an electro-catalyst comprising from 80% to 95% platinum and from 5% to 20% ruthenium, i.e., 80% Pt-20% Ru, 81% Pt-19% Ru, 82% Pt-18% Ru, 83% Pt-17% Ru, 84% Pt-16% Ru, 85% Pt-15% Ru, 86% Pt-14% Ru, 87% Pt-13% Ru, 88% Pt-12% Ru 89% Pt-11% Ru, 90% Pt-10% Ru, 91% Pt-9% Ru, 92% Pt-8 % Ru, 93% Pt-7% Ru, 94% Pt-6% Ru, 95% Pt-5% Ru co-deposited on a Raney Nickel support.

In some embodiments, the electro-catalyst is a tri-metallic catalyst. In most embodiments, the electrodes having a trimetallic electro-catalyst will have a combination of three of the following metals co-deposited, with amounts in the following ranges: platinum in the range from about 40%, 45%, 50%, 55%, 60%, 65%, 70%, 75%, 80%, 85%, 90%, 95%, 98%, 99% to about 100%; iridium in the range from about 10%, 15%, 20%, 25%, 30%, 35%, 40%, 45% to about 50%; ruthenium in the range from about 5%, 10%, 15%, to about 20%; rhenium in the range from about 5%, 10%, 15%, to about 20%; palladium in the range from about 5%, 10%, 15%, to about 20%; gold in the range from about 10%, 15%, 20%, 25% to about 30%; nickel in the range from about in the range from about 0%, 1%, 5%, 10%, 15%, 20%, 25%, 30%, 35%, 40%, 45%, 50%, 55%, 60%, 65%, 70%, 75%, to about 80%; and iron in the range from about 0%, 1%, 5%, 10%, 15%, 20%, 25%, 30%, 35%, 40%, 45%, 50%, 55%, 60%, 65%, 70%, 75%, to about 80%. In one embodiment, the compositions of the tri-metallic catalyst is Pt—Ir—Ru. In one embodiment, the trimetallic electro-catalyst comprises from 40% to 90% platinum, from 5% to 50% iridium and from 5% to 20% ruthenium. In another embodiment, the trimetallic electro-catalyst comprises from 40% to 90% platinum, from 5% to 50% iridium and from 5% to 20% ruthenium, with the trimetallic electro-catalyst deposited a on Raney Nickel support to form the electrode. In another embodiment, the composition of the tri-metallic electro-catalyst is Pt—Ir—Ni. In another embodiment, the electro-catalyst contains from 40% to 90% platinum, from 5% to 50% iridium and from 5% to 45% nickel. In yet another embodiment, the composition of the tri-metallic electro-catalyst is Pt—Ru—Ni. In another embodiment, the electro-catalyst contains from 40% to 90% platinum, from 5% to 20% ruthenium, and from 5% to 45% nickel. Other metals that are active to the oxidation of ammonia may also be used. Additionally, other metal ratios may also be used.

One advantage of the electro-catalysts described herein is that a much lower loading of catalyst is necessary than for other electro-catalysts, which results in lower cost in producing the electro-catalysts than can otherwise be achieved. If desired, higher loadings may also be used. The electro-catalyst loading may be from monolayer loading to many layers on the substrate. In some embodiments, the loading will be close to a few monoatomic layers of electro-catalyst on the substrate or Raney-metal treated substrate. In other words, the loading may be in the range from about 0.0002 mg/cm$^2$ to about 100 mg/cm$^2$. In one embodiment, the catalyst loading will be less than or equal to about 1 mg/cm$^2$. In some embodiments, the loading corresponds to a thickness of approximately 100 Å.

The electro-catalysts described herein may further comprise binders, and fillers. Binders suitable for use with the electro-catalysts include, but are not limited to Teflon and Nafion. Suitable fillers may be selected from, for example, graphite and carbon black. Other suitable binders and fillers may be selected by those skilled in the art.

Application to an electrolytic cell Hydrogen is the main fuel source for power generation using fuel cells, but its storage and transportation are still major issues. Current hydrogen production costs make fuel cell technology for power generation economically non-competitive when compared to traditional oil generation power systems. Current technologies are able to produce hydrogen at costs of between $5 to $6 per kg of $H_2$, due to separation costs, high temperature and high pressure operating conditions, etc.

The developed electrode comprising an electro-catalyst is used as an anode in an electrolytic cell where ammonia is being oxidized offers the potential of large cost savings in the production of hydrogen when compared with current technologies. In order to reduce the hydrogen production costs, the electrolysis of ammonia in alkaline solutions is utilized. This technology has the potential to bring the production costs of $H_2$ to as low as $1.7 per kg of $H_2$ produced including the cost of ammonia. Other benefits of the technology are: 1) minimization of the hydrogen storage problem, 2) fuel flexibility, and 3) zero hazardous environmental emissions. The electrolysis of ammonia generates inert nitrogen gas as a by-product, which does not cause any hazards to the environment and may be used downstream for other applications. In addition, the storage of ammonia is commercially feasible, as it can be transported in low-pressure cylinders; therefore the electrolysis of aqueous ammonia in alkaline media helps solve the problem of hydrogen storage.

The electrolytic cells described herein have a) one or more electrodes comprising catalysts as described herein, b) a basic electrolyte solution; and c) ammonia. The basic electrolyte can be any alkaline electrolyte that which is compatible with the catalyst, does not react with ammonia, and has a high conductivity. The basic electrolyte is added in excess of the stoichiometric proportions needed. In some embodiments, the basic electrolyte is added at a level of about three times greater than the amount of ammonia added. In one embodiment, the basic electrolyte is potassium hydroxide, used at a concentration of about 3M to about 7M. In one embodiment, potassium hydroxide is added at a level of about 5M. In another embodiment, the basic electrolyte is sodium hydroxide. In other embodiments, basic electrolytes used include other alkali metal hydroxides and alkali earth metal hydroxides. Additionally, other alkaline electrolytes may be used provided that they are compatible with the catalyst, do not react with the ammonia, and have a high conductivity.

The ammonia for the electrolytic cells described herein is an ammonia solution, and the source of the ammonia is not particularly limited. The ammonia for the electrolytic cells may be dissolved in water, i.e., ammonium hydroxide, which may be stored until ready for use, and then fed directly to the cell; the ammonia may be stored as a liquefied gas, at higher pressure, and then combined with water and the electrolyte when ready to use; the ammonia may also be obtained from suitable ammonium salts, such as ammonium sulfate, dissolved in the electrolyte solution. The ammonia may be present at a concentration from about 0.01M to about 5M. In some embodiments, the ammonia concentration in the electrolytic cell will be from about 1M to about 2M at ambient temperature. In embodiments that operate at higher temperatures, higher concentrations of ammonia may be desired.

The electrodes comprising the electro-catalysts described herein may be used as the anode of the electrolytic cell, or as both the anode and the cathode. In one embodiment, the electrolytic cell has a) at least one electrode comprising a bimetallic catalyst as described herein; b) potassium hydroxide at a concentration from about 3 M to about 7 M; and c) ammonia at a concentration from about 0.5 M to 2 M. In another embodiment, the electrolytic cell comprises a) two electrodes comprising electro-catalysts as described herein; b) about 5 M potassium hydroxide; and c) about 1 M ammonia. In yet another embodiment, the anode and the cathode of the electrolytic cells both comprise Pt—Ru catalysts described herein. In some embodiments, the Pt—Ru catalysts used are Pt:Ru with ratios of 1:25, 1:5, and 1:10. When an electrode comprising the electro-catalysts described herein is used as only one of the electrodes in the electrolytic cell, the other electrode may be selected from any electrode having an activity toward hydrogen evolution in alkaline media. Some examples of such electrodes include but are not limited to noble metals, such as platinum, rhenium, palladium, as well as Raney Nickel. Other electrodes suitable for use in the electrolytic cell can readily be determined by those skilled in the art.

These electrolytic cell may operate over a wide range of temperatures. Generally the electrolytic cell described herein may be operated in the range from about 20° C. to about 70° C. In embodiment, the cell is operated at ambient temperature. In another embodiment, the temperature range is from about 60° C. to about 70° C. In another embodiment, pressures higher than atmospheric pressure are be used, allowing temperatures higher than 70° C. to be used.

The current densities applied to the electrolytic cell to produce hydrogen may be in the range from about 25 mA/cm$^2$ to about 500 mA/cm$^2$. In some embodiments, the current densities will be in the range from about 50 mA/cm$^2$ to about 100 mA/cm$^2$.

The electrolytic cells described herein are especially useful in the production of hydrogen. A secondary aspect of the electrolytic is that they are also useful in the product of nitrogen. Accordingly, the fuel cells described herein may also be used in methods for the preparation of hydrogen gas and methods for the preparation of nitrogen gas using the alkaline ammonia electrolytic cells and catalysts described herein. Additionally, the electrolytic cells described herein may also be used as ammonia sensors and may be used to decontaminate effluents that are contaminated with ammonia contaminants.

Application to ammonia fuel cells: Ammonia fuel cells are identical in function to alkaline fuel cells except for the fact that ammonia rather than hydrogen is used as a fuel. FIG. 1 shows one possible embodiment for an ammonia fuel cell. In many ways, ammonia is an ideal fuel for fuel cells. Ammonia represents a convenient way of securing supplies of hydrogen with one cylinder of ammonia yielding the equivalent to nine or ten cylinders of hydrogen. The fact that ammonia is easily condensed makes it a good choice for transportation and storage. Even though it is flammable and toxic within defined limits, its presence can be detected by its characteristic odor. Ammonia is readily available and its decomposition by electro-oxidation in alkaline media is environmentally friendly with nitrogen and water as main products of reaction.

At ambient temperature, considerable current densities can be obtained from the oxidation of ammonia on the electro-catalyst described herein compared to traditional catalysts such as impregnated platinum or any combination of impregnated noble metals on an appropriate substrates (carbon black, Teflon, graphite, and so forth). Utilizing the electro-catalysts described herein, it is expected that significant sustainable power can be achieved from ammonia fuel cells at ambient temperature.

Additionally, the electro-catalysts described herein have applications in an ammonia fuel cell. The ammonium fuel cell has an anode, which is an electrode comprising the electro-catalyst described herein; a cathode, ammonia, and a basic electrolyte. Nickel and platinum black are two examples of suitable cathodes, though other cathodes may be used. These fuel cells may be operated at any temperature from about ambient temperature, e.g., about 20 to 25° C. up to about 70° C. In most embodiments, the fuel cells described herein are operated at ambient temperature. The basic electrolyte used in the fuel cell may be any suitable basic electrolyte, for example, an inorganic hydroxide, such an alkali metal hydroxide or alkali earth metal hydroxide. Suitable basic electrolytes include alkaline media that do not adversely affect the electro-catalysts described herein, do not react with ammonia, and have good conductivity. In some embodiments, the electrolytes are potassium hydroxide or sodium hydroxide. In one embodiment, the electrolyte is potassium hydroxide. The concentration of the basic electrolyte is generally at least about three times greater than the concentration of the ammonia. In some embodiments, the concentrations of basic electrolyte and ammonia are about 5M and about 1M, respectively. The ammonia for the fuel cell can be from liquid or gaseous ammonia dissolved in water or in the basic medium, or it can be from a suitable ammonium salt dissolved in the basic medium.

Application ammonia electrochemical sensors: The substantial current response collected at the anode during oxidation of ammonia (even at small concentrations) in the presence of the electro-catalyst described herein makes this latter a candidate of choice as an ammonia electrochemical sensor.

An electrolytic cell comprising the electrodes described herein may be used for measurement of the concentration of ammonia present in solution in any chemical process. To do this the solution containing ammonia (process solution) needs to be sent to the electrolytic cell (which can be designed very small to fulfill the characteristics of a sensor). FIG. 2 shows an example of the sensor built with the cell. In this particular embodiment, the sensor is installed in the process line through a by pass. When ready to measure the concentration of ammonia a fixed amount of volume from the process stream is sent to the sensor (the by pass valve is immediately closed after that). The reservoir in this particular sensor cell contains a solution of at least 0.1M potassium hydroxide. When the stream containing the ammonia is fed to the sensor, the working electrode (referred to herein as anode) is rotated to at least 1000 rpm and a potential is applied between the working electrode (anode) and a reference electrode, Hg/HgO in this embodiment, from −0.8 to 0.1 V. By doing this an anodic peak will be observed in a cyclic voltammogram. The height of the peak is proportional to the concentration of ammonia present in the solution. The working electrode is calibrated for different concentrations. The sensor can detect concentrations of ammonia as low as 0.05 mM, and there are no limitations on the maximum concentration of ammonia. The optimum condition for the operation of the sensor is 25° C. (to avoid evaporation of the ammonia present in solution), though the sensor may be operated in the temperature range from 20° C. to 70° C. When the stream of the process is outside of this temperature range, the stream should be brought to the temperature of the sensor. The response of the sensor is instantaneous.

Application to purification of ammonia-contaminated effluents: The strong activity of ammonia on the present electro-catalysts, at high as well as low ammonia concentrations can be put to use in a process aiming at removing ammonia from contaminated effluents. When used in applications for the purification of ammonia-contaminated effluents, the ammonia electrolytic cell can be operated with any source of energy—renewable (wind, solar) or nonrenewable (grid). The effluents are sent to the ammonia electrolytic cell, where ammonia is oxidized and transformed into $N_2$. Furthermore, to improve the efficiency of the system, the hydrogen produced at the cathode can be sent to a fuel cell (PEM fuel cell or alkaline fuel cell) where clean water is produced and return to the environment and the $H_2$ obtained from the ammonia electrolytic cell is transform into energy. The $N_2$ produced at the ammonia electrolytic cell could also be recovered for other applications.

The concentration of ammonia present in the effluents could be as low as 0.5 mM, while the concentration of potassium hydroxide could be as low as 0.12 M. There are no limitations in the maximum concentration of ammonia or potassium hydroxide. As a matter of fact, the higher the concentration of ammonia the more efficient the process. The operating temperature is between 20° C. and 70° C.

When the electrolytic cells described herein are applied to the purification of ammonia-contaminated effluents, the contaminated effluent is sent to the electrolytic cell. A current sufficient to oxidize the ammonia in the contaminated effluent is applied, whereby the ammonia is oxidized and the effluent purified. The process may be a continuous process. In one embodiment, the electrolytic cell used utilizes at least one electrode comprising the electro-catalyst described herein, as well as an alkaline electrolyte as described previously. In some embodiments, the electrolytic cell comprises two electrodes comprising the electro-catalyst described herein. In some embodiments, the cell is operated at ambient temperature. In other embodiments, the cell is operated at 25° C. In still other embodiments, the cell is operated in the temperature range from 20° C. to 70° C.

Unless otherwise indicated, all numbers expressing quantities or percentages in compositions, properties such reaction conditions, and so forth as used in the specification and claims are to be understood as being modified in all instances by the term "about" whether the word "about" is specifically used or not. Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

EXAMPLES

Electrodeposition procedure: Plating solutions were prepared with following precursor salts: hexachloroplatinic acid, ruthenium chloride, iridium chloride, iridium bromide, and rhodium chloride (Alfa Aesar). Reagent grade hydrochloric and phosphoric acid (Fisher) were used as supporting electrolyte and to maintain a low pH. HPLC (Fisher) water was used as a solvent. The composition of the plating solution is given in Table 1.

Titanium was the selected substrate (2.5 cm×5 cm foil, Alfa Aesar). Several pretreatments of the surface were investigated for the improvement of the catalyst adherence and the active surface area: 1) thorough degreasing with acetone in an ultrasonic bath, rinsing before direct use (minimum pre-treatment), 2) sand-blasting, degreasing, rinsing, and 3) D.C. anodization, degreasing, rinsing, using known procedures. (See J-P. Guenau de Mussy, J. V. Macpherson, J-L Delplancke, *Electrochim. Acta*, 48, 1131, (2003); E. Mahé, D. Devilliers, *Electrochim. Acta*, 46, 629, (2000), each incorporated herein by reference.)

Electrodeposition took place in a 250 ml cell, surrounded by a thermostatic bath at 75° C. (at lower temperature, iridium electrodeposition does not occur at an acceptable rate). The cell was immersed in an ultrasonic bath to maintain a homogeneous bulk concentration. Ultrasonic shaking of the deposits is also advantageous in the case where poorly adherent deposit may occur (weakly deposited particles are selectively detached from the surface). Deposition occurred either galvanostatically or by current pulses. D.C current was provided by the Arbin cycler BT2000.

Characterization procedures: The study of the deposit morphology was performed by Scanning Electron Microscopy (SEM) combined with Energy Dispersive Spectroscopy (EDX). From this latter technique, the bulk composition of the deposited film was obtained. The chemical composition at the surface of the deposit was determined by X-ray Photoemission Spectroscopy using Al-k x-rays from a dual anode x-ray source on a Kratos XSAM800 electron spectrometer.

Physical properties of interest are the weight of the deposited metals, the geometric surface area of the deposit, and its electrochemically active surface area. This latter was obtained by coulometric measurements in the hydrogen adsorption region (for Pt, Ir, and Rh) or in the oxygen desorption region (Ru). Coulometric data were recorded during cyclic voltammetry run at 10 mV/s in 1M sulfuric acid. Table 1 summarizes the properties of seventeen prepared electrodes.

TABLE 1

Bath and deposit compositions for example catalysts 1-17

| Example | Bath composition | Amount deposited (mg) | XPS composition (atomic %) |
|---|---|---|---|
| 1 | 100 mg Pt | 18.2 | X |
| 2 | 100 mg Rh | 19.3 | X |
| 3 | 100 mg Ru | 20 | X |
| 4 | 100 mg Ir | 20.5 | X |
| 5 | 100 mg Pt + 100 mg Rh | 26.5 | 55% Pt/ 45% Rh |
| 6 | 100 mg Pt + 100 mg Ru | 20.4 | 15% Pt/ 85% Ru |
| 7 | 100 mg Rh + 100 mg Ru | 20.2 | 55% Rh/ 45% Ru |
| 8 | 100 mg Rh + 100 mg Ir | 20 | 100% Rh |
| 9 | 100 mg Ru + 100 mg Ir | 22.9 | 100% Ru |
| 10 | 100 mg Ru + 100 mg Ir | 23.7 | 70% Ir/ 30% Ru |
| 11 | 100 mg Rh + 100 mg Ir | 35.2 | 80% Rh/ 20% Ir |
| 12 | 100 mg Pt + 100 mg Ir | 36.3 | 80% Pt/ 20% Ir |
| 13 | 100 mg Pt + 500 mg Ir | 32.5 | 60% Ir/ 40% Pt |
| 14 | 100 mg Pt + 1000 mg Ir | 31.9 | 70% Ir/ 30% Pt |
| 15 | 100 mg Pt 100 mg Ir 100 mg Rh | 19.9 | 60% Rh 40% Pt <5% Ir |
| 16 | 100 mg Pt 100 mg Ir 100 mg Ru | 20 | 85% Rh 15% Pt <5% Ir |
| 17 | 100 mg Pt 500 mg Ir 20 mg Ru | 11.1 | 50% Ru 30% Pt 20% Ir |

A galvanostatic staircase deposition procedure was used to determine the current density needed to deposit Pt, Ir, Ru, and Rh from their chloride salt at 75° C. in 1M HCl. Each solution was prepared with 100 mg of dissolved metal in a 250 ml solution. It was found that, in these conditions, acceptable Pt deposition rate occurred at low current densities (0.6 to 1.4 mA/cm$^2$). Over the same range, rhodium deposition rate was fast and under apparent mass transfer limitation. Higher current densities were necessary for ruthenium. Iridium deposition from chloride salt was not possible, even at very high overpotentials where HER occurred. However, iridium was successfully deposited from bromide salt dissolved in 1M phosphoric acid solution at current densities around 4mA/cm$^2$. From observed plating tendencies, one may expect preferential deposition of Pt and Rh over Ru and Ir when bimetallic deposits are sought. Such experiments were run under the same experimental conditions as described above and unexpected results were obtained. The chemical composition of the surface of the deposit as obtained by XPS (see Table 1) shows an unexpected preferential deposition of Ru (85%) over Pt (15%) in Pt—Ru deposits at high current densities (overpotential). The co-deposition of Pt and Ir from chloride bath was possible even though Ir alone would not deposit in at a measurable rate over the covered range of experimental conditions. When deposited at high current densities, the ratio of Ru:Rh at the surface is close to 1:1, in agreement with the fact that these two metals have similar deposition rates under mass transfer limitation (above 8 mA/cm$^2$). The same explanation applies to the observed Pt—Rh ratio of 1:1 but at lower current densities (4 mA/cm$^2$). Ir did not co-deposit with Ru or Rh from a solution containing their respective chloride salts but Ir—Ru and Ir—Rh co-deposition occurred in phosphoric acid solutions with $IrBr_3$ and $RuCl_3$ and $RhCl_3$ as precursor salts. When preparing trimetallic catalysts from chloride salts, preferential deposition of either Ru or Rh over Pt and low contents of Ir were observed.

The use of ultrasonic bath was found beneficial when Pt was at high overpotentials in which case porous and poorly adherent Pt is formed; the adherence of Pt deposit was improved by removal of weakly adherent particles.

Both active surface area of the deposited catalysts and its adherence to the substrate was improved by selecting the appropriate pre-treatment of the titanium foil. Simple degreasing of the foil in acetone followed by thorough rinsing before plating led to poorly adherent deposits and sometimes to no deposition at all. The use of sandblasting in pre-treatment improved the adherence. Adherence results are reported in the form of a stress limit σ (in kg/cm$^2$) before the deposit detached during a z-test (Quad Group). For comparison, the measured stress limit before rupture of epoxy-titanium contact was 450 kg/cm$^2$. Good adherence properties and larger deposited surface area were obtained by D.C. anodization of the surface. This procedure consists of applying a current around 60 mA/cm$^2$ between the substrate-electrode and a counter electrode made of stainless steel, both immersed in a 5M $H_2SO_4$ solution. As a titanium oxide layer ($TiO_2$) grows at the interface, the required cell voltage increases up to 100-120 V. At such voltages, sparking occurs at the electrode surface, leaving a porous but stable oxide layer in which noble metals can be deposited. Results presented in Table 2 show that for the special case of Pt—Ir deposition (electrode E and N), the active surface area was increased by 40% using such procedure compared with simple sandblasting.

TABLE 2

Chemical, physical and structural properties of selected electrodes

| Example | Pretreatment | Bath composition (mg) | XPS composition (atomic #) | Roughness factor, R (cm$^2$/cm$^2$) | Stress limit, σ, (kg/cm$^2$) |
|---|---|---|---|---|---|
| 18 | sand blasting | 100 mg Pt | X | 17 | 54 |
| 19 | sand blasting | 100 mg Rh | X | 167 | 28 |
| 20 | sand blasting | 100 mg Ru | X | 104 | 25 |
| 21 | sand blasting | 100 mg Ir | X | 124 | 58 |

TABLE 2-continued

Chemical, physical and structural properties of selected electrodes

| Example | Pretreatment | Bath composition (mg) | XPS composition (atomic #) | Roughness factor, R ($cm^2/cm^2$) | Stress limit, σ, ($kg/cm^2$) |
|---|---|---|---|---|---|
| 22 | sand blasting | 100 mg Pt<br>100 mg Ir | 80% Pt,<br>20% Ir | 214 | 133 |
| 23 | sand blasting | 100 mg Pt<br>500 mg Ir | 60% Ir,<br>40% Pt | 298 | 64 |
| 24 | sand blasting | 100 mg Pt<br>1000 mg Ir | 70% Ir,<br>30% Pt | 329 | 38 |
| 25 | sand blasting | 100 mg Pt<br>100 mg Ir | 90% Pt,<br>10% Ir | 96 | 94 |
| 26 | sand blasting | 100 mg Pt<br>100 mg Ir | 80% Pt,<br>20% Ir | 414 | 30 |
| 27 | sand blasting | 100 mg Pt<br>100 mg Ir | 80% Pt,<br>20% Ir | 152 | 40 |
| 28 | sand blasting | 100 mg Pt<br>100 mg Ir | 75% Pt,<br>25% Ir | 705 | 40 |
| 29 | sand blasting | 100 mg Pt<br>100 mg Ir | 90% Pt,<br><10% Ir | 104 | 60 |
| 30 | sand blasting | 100 mg Pt<br>100 mg Ir | 80% Pt,<br>20% Ir | 356 | 104 |
| 31 | D.C. anodization | 100 mg Pt<br>100 mg Ir | 80% Pt,<br>20% Ir | 351 | 126 |

Adherence tests and active surface area for each monometallic and bimetallic catalyst are summarized in Table 2. The adherence properties of the deposit were measured by performing a coating adherence test with a Z-module Sebastian Five-A tester from Quad Group. Rather than the active surface area, the roughness factor, R, is reported. This factor is defined as the ratio of the active surface area (obtained by cyclic voltammetry and calculated from the coverage of the catalyst surface by adsorbed hydrogen, in $cm^2$) by the measured geometric surface area (in $cm^2$). Cyclic voltammograms in $H_2SO_4$ are very much like a fingerprint that characterizes a noble metal. A comparison of cyclic voltammograms of Pt, Ir, Ru, and Rh (not shown) with available voltammograms from the literature allowed the conclusion that titanium-deposited noble metals behave, from an electrochemical point of view, in a very similar manner to bulk noble metals.

From Table 2 it is seen that Pt and Ir have good adherence to the substrate whereas Ru and Rh deposits are weaker. This was confirmed as well by the SEM pictures (not shown) showing flaky deposits for Ru and Rh and more compact deposits for Pt and Ir. Pt showed a considerable lower roughness factor than other deposited metals.

Catalyst performance testing: Developed catalysts were systematically tested in a one-compartment three-electrode-1 L glass cell (FIG. 3). The reference electrode was Hg/HgO (+0.092V/SHE), and the counter electrode was made of platinized titanium foil with a geometric surface area three times larger than the working electrode. The cell includes three additional ports for gas inlet (purging) and outlet, and for temperature/pH measurements. A condenser was added to the outlet gas stream to minimize water and ammonia evaporation while working at higher temperature than ambient. Cyclic voltammetry and galvanostatic tests were run in a 1M $NH_3$, 5M KOH solution. The temperature of the cell was set to 25° C. or 65° C. by a thermostatic bath. The solution remained unstirred during experimentation. D.C current was provided by an Arbin cycler BT2000.

Results: Cyclic voltammetry on Pt—Rh showed that much lower overpotentials could be achieved on this bimetallic catalyst (0.27V) compared to any of constituent metals (overpotential of 0.4V on Pt and 0.6V on Rh). The reduction peak, which is characteristic of Rh catalysts was still present but had been shifted cathodically. Pt—Ir catalysts combined both properties of Pt (stable catalytic activity in time, higher achievable current densities) and Ir (low overpotential). Galvanostatic tests confirmed the stability of the Pt—Ir catalyst activity in time. According to previous results Pt—Ir—Ru and Pt—Ir—Rh trimetallic catalysts were tested. Pt—Ir—Rh catalysts performed very well under cyclic voltammetry with comparatively high current densities at low overpotential (0.27V).

One way to increase the active surface area toward ammonia oxidation is to increase the loading of noble metal. A linear relationship was found between deposited amount of noble metal and active surface area. The mode of deposition (galvanostatic or pulse deposition) did not influence significantly the active surface area, except when large overpotentials (current densities) were used. In such cases, the observed deposit is much more compact and the observed active surface area was smaller. As expected, better kinetics were observed with larger active surface areas, all other parameters remaining constant. As mentioned earlier, substrate pretreated by D.C. anodization offers a larger active surface area. For the same loading of noble metals, the kinetics of ammonia oxidation was also improved when using such pre-treatment.

The influence of $NH_3$ and KOH concentrations was observed that ammonia concentration does not affect the kinetics of oxidation if kept above 0.01M and as long as it is kept below the stoechiometric conditions. Experiments showed that an increase in temperature significantly decreases the overpotential at the anode of the electrolytic cell, in agreement with Arrhenius law. At 65° C., the Tafel's slope measured was 180 mV/decade, which is much larger than the 40 mV/decade slope observed on Pt.

Example 32

Ammonia Oxidation as Part of an Electrolytic Cell for Hydrogen Production

Following results were obtained with developed Pt—Ir catalyst as the anode of an alkaline electrolytic cell. The Pt—Ir catalyst was deposited onto a 60 $cm^2$ foil rolled in the shape of a ring. The cathode was also a ring-shaped titanium foil on which Pt—Ru was deposited. The two electrodes were concentric in their assembly. The cell potentials as well as the anodic and cathodic overpotentials are reported for current densities from 5 mA to 1A (see FIGS. 4 and 5). With the Pt—Ir catalyst at the anode, cell voltages around 0.35V were needed (at 65° C.) to obtain current densities around 1 mA/cm². The cell voltage was largely due to the polarization overvoltage at the anode (0.25V in such conditions) showing significant improvement of kinetics of ammonia oxidation. The energy efficiency of the cell can be defined as:

$$\varepsilon = \frac{\Delta E^0}{\Delta E} = \frac{\Delta E^0}{\Delta E^0 + \eta_A + \eta_c + \eta_{IR}}$$

where $\Delta E^0$ represents the reversible cell voltage (0.06V) and $\Delta E$ represents the actual measured cell voltage (sum of the reversible voltage, anodic, cathodic, and ohmic overvoltage). Efficiencies as high as 22% are achieved with the currently developed cell. In terms of energy consumption and hydrogen cost, assuming the cost of required electricity at $0.214/kW-h (produced from solar energy) and the cost of ammonia at $150/ton, hydrogen is produced with 7.4 kW-h/kg $H_2$ and at a cost of hydrogen $2.4/kg $H_2$. This shows the promise of presented technology to answer the objective of the US Department of Energy, which set the cost of hydrogen production at $2/kg $H_2$.

In our experiments, hydrogen and nitrogen were produced with 100% electrical efficiency. It was observed that for each hydrogen molecule produced two electrons are consumed during the overall reaction. Further testing of the ammonia content in the produced gases was achieved by bubbling produced gases into distilled water and by monitoring its pH. At thermodynamic equilibrium between the gas phase and the liquid phase, the pH was found to be 9. Using the phase equilibrium equations for a weak electrolyte as derived by Edwards et al., the corresponding concentration of ammonia in the gas phase is found to be 0.5 ppm.

Example 33

Procedure for Raney Nickel/Platinum Electrode

A Raney Nickel/platinum electrode was prepared as follows: 1) A solution containing 45 g/L $NiCl_2$, 30 g/L $H_3BO_4$, 300 g/L $NiSO_4$, and 15 g/L Raney Alloy was prepared. 2) An electrode made of titanium mesh was prepared and placed into the solution. 3) A counter electrode consisting of a nickel electrode placed into a cotton bag along with nickel shot was prepared. 4) The solution was agitated via a stir bar. At this point, the titanium mesh electrode should be at an angle of 135°. 5) Electroplating galvanostatically at a current density of 100 mA/cm² and a charge density of 350 C/cm² was begun. The titanium mesh electrode was flipped every 250-350 C. 6) After the electroplating was complete, the resulting Raney nickel electrode was placed into a 32% w/v NaOH solution at a temperature of 60° C. along with sonic agitation for a period of at least 18 hours; this leached the aluminum present in the alloy into the solution. 7) Once the electrode had been leached, it was placed into a plating bath containing 165 mg $H_2PtCl_6$, 50 mL 32%w/v NaOH, and 30 mL HPLC water. The solution was agitated via a stir bar. 8) For a electroplating current of 5 mA, the required length for deposition for a desired platinum loading can be found via Faraday's Law. For example, for a loading of 5 mg/cm² on a 4 cm² (both sides of a 2 cm×1 cm sample) electrode, plating should occurred for 2 hours, 11 minutes, and 54 seconds. 9) The electrode was removed from solution and cleaned with distilled water. The prepared electrode was now ready for use.

Results. There was an increase in the current density when compared to a Ti substrate. Combinations of Pt—Ir on Raney Nickel substrate performed better (see the curve label Pt—Ir).

Example 34

Preparation of a Raney Nickel Bimetallic Catalyst

A Raney Nickel bimetallic catalyst as described herein was prepared as follows. First, 2 solutions were prepared as follows: Solution 1: 3 g Boric Acid, 4.5 g Nickel(II) Chloride, 30 g Nickel(II) Sulfate, and 1 g Raney Alloy (Ni:Al 1:1), dissolved in high-purity water to a total volume of 100 mL. Solution 2: 18 mM/L Chloroplatinic Acid, 20% w/v Sodium Hydroxide, dissolved in HPLC to a total volume of 100 mL. Experimental Procedure: 1) A Nickel electrode was mechanically roughened, via sandblasting, rubbing with sandpaper, or other means. 2) Electrode was degreased with a warm (60° C.) solution of 20% NaOH for 15 minutes, then washed with distilled water. 3) Electrode was etched with 18% HCl for 2 minutes, then washed with distilled water containing 5 mL HCl/L. 4) Electrode was placed into an agitated electrolytic cell containing Solution 1. The electrode was positioned so that it makes an angle of 135° so as to catch any Raney alloy particles falling by gravity. 5) Using a counter electrode of Ni foil, a current of 60 mA/cm² was passed through the solution galvanostatically against the Ni electrode. The electrode was turned over ever 100 coulombs to ensure even coating on both sides. 6) The electrode (now coated with Raney Ni powder) was activated by immersing in a 125 mL beaker containing 80 mL of 30% NaOH, heated at 755° C. for 18 hours. 7) The electrode was placed in an electrolytic cell containing Solution 2. A current of 300 mA/cm² was passed through the solution for 60 minutes. 8) The electrode was rinsed with distilled water. The electrode contained a first layer of activated Raney Nickel, which has a second layer of noble metals deposited onto it.

The examples described herein are meant to be illustrative of the invention. These examples are not meant to limit the scope of the invention.

The invention claimed is:

1. An electrode for the oxidation of ammonia in alkaline media; the electrode comprising:
    a) a support; and
    b) a multi-metallic electro-catalyst, the multi-metallic electro-catalyst comprising a noble metal and one or more other metals that are active to ammonia oxidation co-deposited on the support; wherein the multi-metallic electro-catalyst is a trimetallic electro-catalyst comprising platinum, ruthenium, and nickel.

2. The electrode of claim 1 wherein the trimetallic electro-catalyst comprises from 40% to 90% platinum, from 5% to 20% ruthenium, and from 5% to 45% nickel.

3. An electrode for the oxidation of ammonia in alkaline media; the electrode comprising:
    a) a support; and
    b) a multi-metallic electro-catalyst, the multi-metallic electro-catalyst comprising a noble metal and one or more other metals that are active to ammonia oxidation co-deposited on the support; wherein the multi-metallic electro-catalyst is a trimetallic electro-catalyst comprising from 40% to 90% platinum, from 5% to 50% iridium, and 5% to 20% ruthenium and wherein trimetallic electro-catalyst is on a Raney Nickel-treated support.

4. An electrolytic cell for the production of hydrogen, the electrolytic cell comprising:
    a) one or more electrodes, wherein the one or more electrodes comprise a support and a multi-metallic electrocatalyst, the multi-metallic electro-catalyst comprising a noble metal and one or more other metals that are active to ammonia oxidation co-deposited on the support;

b) an alkaline electrolyte solution; and c) ammonia.

5. The electrolytic cell of claim 4 wherein the alkaline electrolyte is in excess of stoichiometric proportions needed.

6. The electrolytic cell of claim 5 comprising 3 times more alkaline electrolyte than ammonia, stoichiometrically.

7. The electrolytic cell of claim 4 wherein the alkaline electrolyte is selected from potassium hydroxide and sodium hydroxide.

8. The electrolytic cell of claim 7 wherein the concentration of alkaline electrolyte is from 0.1M to 7M.

9. The electrolytic cell of claim 8 wherein the concentration of alkaline electrolyte is from 3M to 7M.

10. The electrolytic cell of claim 8 wherein the concentration of the alkaline electrolyte is 5M.

11. The electrolytic cell of claim 4 wherein the concentration of ammonia is in the range from 0.1M to 5M.

12. The electrolytic cell of claim 11 wherein the concentration of ammonia is in the range from 1M to 2M at ambient temperature.

13. The electrolytic cell of claim 4 wherein the electrolytic cell comprises:

a) one or more electrodes, wherein the multi-metallic electro-catalyst is a bimetallic electro-catalyst;

b) an alkaline electrolyte solution, wherein the alkaline electrolyte solution is potassium hydroxide and wherein the concentration of potassium hydroxide is in the range from 0.1M to 7M; and c) ammonia, wherein the concentration of ammonia is from 0.1M to 2M.

14. The electrolytic cell of claim 4 wherein the electrolytic cell comprises:

a) two electrodes;

b) an alkaline electrolyte solution, wherein the alkaline electrolyte solution is potassium hydroxide and wherein the concentration of potassium hydroxide is in the range from 0.1M to 7M; and c) ammonia, wherein the concentration of ammonia is from 0.1M to 2M.

15. The electrolytic cell of claim 14 wherein the electrolytic cell comprises:

a) two electrodes;

b) an alkaline electrolyte solution, wherein the alkaline electrolyte solution is potassium hydroxide and wherein the concentration of potassium hydroxide is about 5M; and c) ammonia, wherein the concentration of ammonia is about 1M.

16. The electrolytic cell of claim 4 wherein the electrolytic cell comprises:

a) two electrodes, wherein the multi-metallic electro-catalysts are bimetallic catalysts;

b) an alkaline electrolyte solution, wherein the alkaline electrolyte solution is potassium hydroxide and wherein the concentration of potassium hydroxide is in the range from 3M to 7M; and c) ammonia, wherein the concentration of ammonia is from 0.5 to 2M.

17. The electrolytic cell of claim 16 wherein the electrodes comprise Pt—Ru catalysts.

18. The electrolytic cell of claim 17 wherein the Pt—Ru catalysts have a Pt:Ru ratio in the range from 1:25 to 1:5.

19. The electrolytic cell of claim 4 comprising a second electrode, wherein the second electrode has an activity toward hydrogen evolution in alkaline media.

20. The electrolytic cell of claim 19 wherein the second electrode is selected from the group consisting of platinum, rhenium, palladium, and Raney Nickel.

21. An electrolytic cell for the production of hydrogen, the electrolytic cell comprising:

a) one or more electrodes, wherein the one or more electrodes comprise a support and a multi-metallic electro-catalyst, the multi-metallic electro-catalyst comprising a noble metal and one or more other metals that are active to ammonia oxidation co-deposited on the support;

b) an alkaline electrolyte solution; and c) ammonia; wherein the electrolytic cell is operated in the temperature range from 20° C. to 70° C.; and wherein the current densities applied to the electrolytic cell are in the range from 25 mA/cm$^2$ to 500 mA/cm$^2$.

22. An electrolytic cell for the production of hydrogen, the electrolytic cell comprising:

a) one or more electrodes, wherein the one or more electrodes comprise a support and a multi-metallic electro-catalyst, the multi-metallic electro-catalyst comprising a noble metal and one or more other metals that are active to ammonia oxidation co-deposited on the support;

b) an alkaline electrolyte solution; and c) ammonia; wherein the electrolytic cell is operated at pressures higher than atmospheric pressure and temperatures above 70° C.; and wherein the current densities applied to the electrolytic cell are in the range from 25 mA/cm$^2$ to 500 mA/cm$^2$.

23. A sensor for measuring concentration of ammonia present in a solution; the sensor comprising an electrolytic cell; the electrolytic cell comprising:

a) a working electrode, wherein the working electrode comprises a support and a multi-metallic electro-catalyst, the multi-metallic electro-catalyst comprising a noble metal and one or more other metals that are active to ammonia oxidation co-deposited on the support, and wherein the working electrode is a rotating electrode;

b) a reference electrode; and c) an alkaline electrolyte solution, wherein the alkaline electrolyte solution is potassium hydroxide and wherein the concentration of potassium hydroxide is in the range from 0.1M to 7M;

wherein the sensor is operated in at a temperature in the range from 20° C. to 70° C.;

wherein a potential is applied to the working electrode and reference electrode and the concentration of ammonia is proportional to the anodic peak observed in a cyclic voltammogram; and wherein the sensor can detect ammonia concentrations of ammonia as low as 0.05 mM.

24. The sensor of claim 23 wherein the working electrode is rotated at a speed of at least 1000 rpm.

25. A method for removing ammonia contaminants from contaminated effluents, the method comprising the steps of:

a) sending the contaminated effluent to an ammonia electrolytic cell; and b) applying a current sufficient to oxidize the ammonia in the effluent;

wherein the electrolytic cell comprises:

a) at least one electrode comprising a support and a multi-metallic electro-catalyst, the multi-metallic electro-catalyst comprising a noble metal and one or more other metals that are active to ammonia oxidation co-deposited on the support; and b) an alkaline electrolyte solution, wherein the alkaline electrolyte solution is potassium hydroxide and wherein the concentration of potassium hydroxide is in the range from 0.1M to 7M;

wherein the cell operates in the temperature range from 25° C. to 70° C.

26. The method of claim 25 wherein the electrolytic cell comprises two electrodes comprising a support and a multi-metallic electro-catalyst, the multi-metallic electro-catalyst comprising a noble metal and one or more other metals that are active to ammonia oxidation co-deposited on the support.

* * * * *